United States Patent [19]
Schwarzkopf

[11] Patent Number: 5,961,868
[45] Date of Patent: Oct. 5, 1999

[54] TIGHTENABLE ELECTRICAL SLEEVE HEATER

[75] Inventor: Eugen Schwarzkopf, Lüdenscheid, Germany

[73] Assignee: Hotset Heizpatronen U. Zubehor GmbH, Ludenscheid, Germany

[21] Appl. No.: 09/092,784

[22] Filed: Jun. 5, 1998

[30] Foreign Application Priority Data

Oct. 21, 1997 [DE] Germany .............. 197 46 311

[51] Int. Cl.[6] .................................................. H05B 3/58
[52] U.S. Cl. ............................................ 219/535; 338/226
[58] Field of Search .................................. 219/535, 536,
219/544, 550, 347, 633, 621, 243; 425/549,
547; 55/64, 67; 338/226

[56] References Cited

U.S. PATENT DOCUMENTS

| | | | |
|---|---|---|---|
| 4,091,355 | 5/1978 | Beck | 219/347 |
| 4,181,060 | 1/1980 | Payne | 85/64 |
| 5,456,592 | 10/1995 | Shindo | 425/549 |
| 5,798,504 | 8/1998 | Schwarzkopf | 219/550 |

*Primary Examiner*—Teresa Walberg
*Assistant Examiner*—Krishan Pasrija
*Attorney, Agent, or Firm*—Herbert Dubno; Andrew Wilford

[57] ABSTRACT

An electrical heater for heating an object having a generally cylindrical outer surface has a helicoidal coil having a plurality of turns centered on an axis and inner and outer ends and adapted to fit around the object in contact with the outer surface thereof. A source of electricity is connected to the inner end for supplying electricity thereto and thereby heating the coil. An anchor fixed on one of the turns adjacent the outer end is connected to an element extending to the anchor for drawing the outer end and anchor together and thereby reducing an inside diameter of at least an outer turn of the coil and tightening the outer turn around the object around which the coil is fitted.

4 Claims, 2 Drawing Sheets

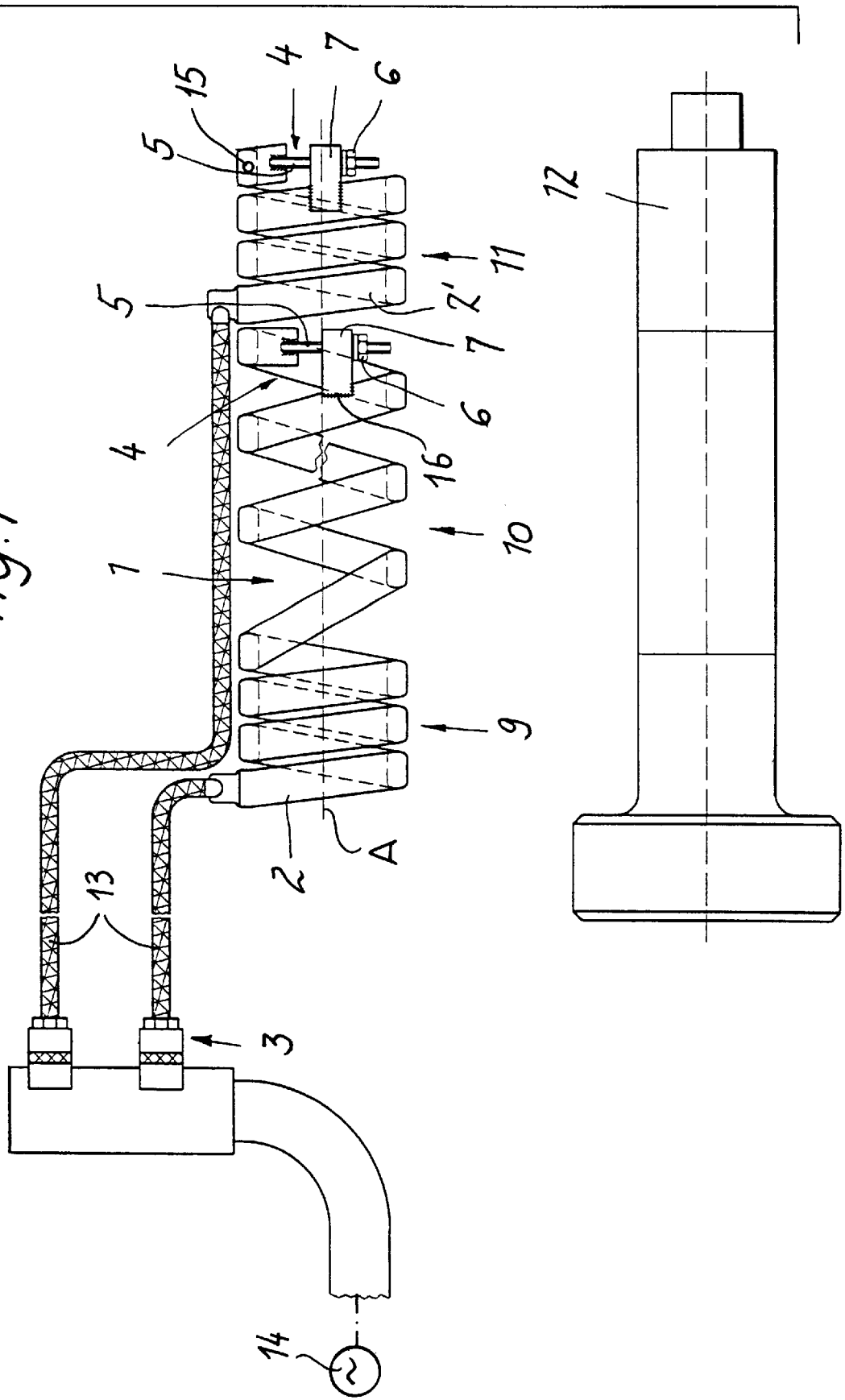

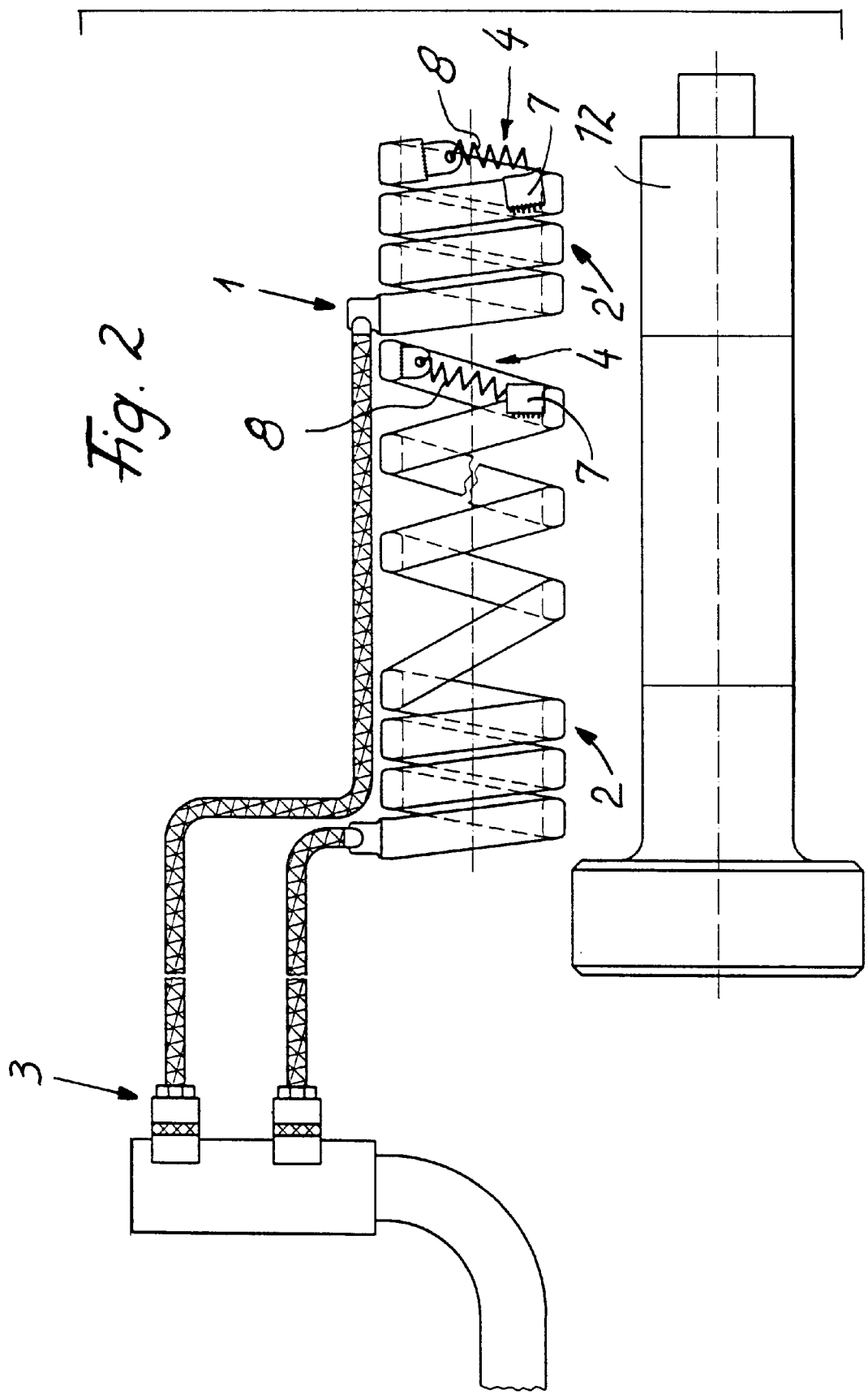

TIGHTENABLE ELECTRICAL SLEEVE HEATER

FIELD OF THE INVENTION

The present invention relates to an electrical sleeve heater. More particularly this invention concerns such a heater used to heat an injection-molding nozzle or similar part through which is passed a material that must be maintained hot.

BACKGROUND OF THIS INVENTION

A standard heater used on, for example, a nozzle of an injection-molding machine comprises a helicoidal body that is slipped over the outer cylindrical surface of the normally tubular nozzle and that has one end connected to a source of electricity. Internally the helicoidal body has a resistive wire surrounded by a mass of insulation, for example magnesium oxide, surrounded in turn by a tubular metal jacket itself shaped into the desired helicoidal shape. When electricity is passed through the wire, it heats and this heat is transmitted through the oxide electrical insulation to the jacket and thence to the outer surface of the object, i.e. the nozzle, it is fitted around.

In order to monitor the temperature of such a heater it is standard to mount a temperature sensor in it. To get an accurate readout, the sensor must be in solid contact with the object and this cannot be assured with the known systems, as they must be dimensioned a little large with respect to inside diameter so that they can be slipped over the object being heated. It is therefore common that the sensor gives a reading that actually is somewhat higher than the actual object being heated, since the portion of the heater that carries the sensor is not in direct contact with this object.

This loose fit of the heater on the object has the further obvious disadvantage that it does not uniformly heat the object. Those portions of the heater that are not in direct contact with the object must transmit heat to it across the normally air-filled gap between it and the object, so that the corresponding portion of the object will not be as hot as the other portions in direct contact with the heater.

OBJECTS OF THE INVENTION

It is therefore an object of the present invention to provide an improved electrical sleeve heater.

Another object is the provision of such an improved electrical sleeve heater which overcomes the above-given disadvantages, that is which ensures excellent contact with the object it is being fitted around, in particular in the region of any sensor provided in the heater.

SUMMARY OF THE INVENTION

An electrical heater for heating an object having a generally cylindrical outer surface has according to the invention a helicoidal coil having a plurality of turns centered on an axis and inner and outer ends and adapted to fit around the object in contact with the outer surface thereof. A source of electricity is connected to the inner end for supplying electricity thereto and thereby heating the coil. An anchor fixed on one of the turns adjacent the outer end is connected to an element extending to the anchor for drawing the outer end and anchor together and thereby reducing an inside diameter of at least an outer turn of the coil and tightening the outer turn around the object around which the coil is fitted.

Thus it is possible in accordance with the invention to draw at least this outer turn of the coil tightly around the object and ensure good surface contact. This is particularly important when according to the invention the heater further has a temperature sensor in the outer turn. In this manner the reading of the temperature sensor will accurately represent the temperature of the object being heated.

The tightening element according to the invention can include a threaded pin extending from the outer end through the anchor and a nut on the pin engageable against the anchor. Alternately it can be a tension spring engaged between the outer end and the anchor. In the first system the heater must be manually tightened after installation and in the second system the spring itself automatically snugs the heater onto the object.

BRIEF DESCRIPTION OF THE DRAWING

The above and other objects, features, and advantages will become more readily apparent from the following description, reference being made to the accompanying drawing in which:

FIG. 1 is a partly diagrammatic side view showing a heater according to the invention and, immediately thereadjacent for clarity of view, the object it is being used to heat; and FIG. 2 is a view like FIG. 1 of another system in accordance with the invention.

SPECIFIC DESCRIPTION

As seen in FIG. 1 a heater 1 according to the invention comprises a pair of helical bodies 2 and 2' each having an inner end connected via a flexible conductor 13 to a connector 3 in turn connected to an electrical power supply 14. As is standard each of these bodies or coils 2 and 2' comprises a metallic and tubular outer jacket, a central resistive heating wire, and a mass of magnesium-oxide insulation filling the jacket around this wire. Both coils 2 and 2' are centered on an axis A and have an internal diameter slightly greater than an external diameter of the cylindrical outer surface of an object 12, here an injection-molding nozzle, over which they are intended to fit. The coil 2 comprises a portion 9 with a shallow pitch and a portion 10 of steeper pitch, while the coil 2' forms another portion 11 of shallow pitch. This is all generally standard.

In accordance with the invention each of these coils 2 and 2' is fitted with a tightening arrangement 4 for its outer-most turn. To this end each outer end is provided with a generally tangentially extending threaded pin or screw 5 that passes through an anchor body 7 secured, here by welding 16, on the adjacent or next-to-last turn of the coil 2 or 2'. A respective nut 6 is threaded on each of these pins 5' on the opposite side of the respective anchor 7.

Thus after the heater 1 has been slipped axially over the body 12, the nuts 6 are screwed down against the anchors 7 to pull at least the final turn of each of the coils 2 and 2' tight against the object 12. The result is extremely intimate contact at least in this region. Normally according to the invention a temperature sensor 15 connected to an unillustrated controller is mounted in the outer region of at least one of these coils 2 and 2' to give an accurate reading of the temperature of the body 12.

In FIG. 2 the system is similar to that of FIG. 1, except that instead of a screw 5 and nut 6, a tension spring 8 is engaged between the outer end of each of the coils 2 and 2' and the anchor 7 on the next-to-last turn.

I claim:

1. An electrical heater for heating an object having a generally cylindrical outer surface, the heater comprising:

a helicoidal coil having a plurality of turns centered on an axis and inner and outer ends and adapted to fit around the object in contact with the outer surface thereof;

means connected to the inner end for supplying electricity thereto and thereby heating the coil;

an anchor fixed on one of the turns adjacent the outer end; and means including an element extending between the outer end and the anchor for drawing the outer end and anchor together and thereby reducing an inside diameter of at least an outer turn of the coil and tightening the outer turn around the object around which the coil is fitted.

2. The electrical heater defined in claim 1, further comprising:

a temperature sensor in the outer turn.

3. The electrical heater defined in claim 1 wherein the element includes a threaded pin extending from the outer end through the anchor and a nut on the pin engageable against the anchor.

4. The electrical heater defined in claim 1 wherein the element includes a tension spring engaged between the outer end and the anchor.

* * * * *